US012208543B2

(12) United States Patent
Ates (10) Patent No.: US 12,208,543 B2
(45) Date of Patent: Jan. 28, 2025

(54) MICRO FILTER DEVICE USED IN PLASTIC RECYCLING (71) Applicant: ALTEK PLASTIK MAKINA SANAYI VE TICARET LIMITED ŞIRKETI, Istanbul (TR)

(72) Inventor: Emrah Ates, Istanbul (TR)

(73) Assignee: ALTEK PLASTIK MAKINA SANAYI VETICARET LIMITED SIRKETI, Istanbul (TR)

( * ) Notice: Subject to any disclaimer, the term of this patent is extended or adjusted under 35 U.S.C. 154(b) by 0 days.

(21) Appl. No.: 18/036,900

(22) PCT Filed: Mar. 2, 2021

(86) PCT No.: PCT/TR2021/050182
§ 371 (c)(1),
(2) Date: May 15, 2023

(87) PCT Pub. No.: WO2022/060318
PCT Pub. Date: Mar. 24, 2022

(65) Prior Publication Data
US 2024/0017446 A1 Jan. 18, 2024

(30) Foreign Application Priority Data
Sep. 18, 2020 (TR) .................. 2020/14862

(51) Int. Cl.
*B29B 17/02* (2006.01)
*B01D 29/64* (2006.01)

(52) U.S. Cl.
CPC .......... *B29B 17/02* (2013.01); *B01D 29/6476* (2013.01); *B29B 2017/0224* (2013.01); *B29B 2017/0255* (2013.01)

(58) Field of Classification Search
USPC ............................................. 209/3
See application file for complete search history.

(56) References Cited

U.S. PATENT DOCUMENTS 3,501,783 A * 3/1970 Broadman .............. E04H 4/086
4/500
5,510,030 A * 4/1996 Bacher ................. B01D 33/466
210/402
6,378,705 B1 * 4/2002 Bacher ................ B29C 48/2735
210/402

FOREIGN PATENT DOCUMENTS

DE 202019102066 U1 * 6/2019
EP 3501783 A1 6/2019
ES 2885599 T3 * 12/2021 ............. B01D 29/05
WO WO-2022060318 A1 * 3/2022 ......... B01D 29/6476

* cited by examiner

Primary Examiner — Terrell H Matthews
(74) Attorney, Agent, or Firm — Jose Cherson Weissbrot (57) ABSTRACT The present invention relates to a filter device with enhancements to ensure the continuity of the function of the flexible scraper element (23), which separates plastic and waste (pollution, foreign matter) from each other, presses on the filtering element to be used in recycling systems for the recovery of plastic materials, to enable the scraper to sharpen itself, to prevent permanent damage on the filtering element (9) due to the melt pressure.

16 Claims, 10 Drawing Sheets

MICRO FILTER DEVICE USED IN PLASTIC RECYCLING

TECHNOLOGICAL AREA

The present invention relates to a filter device with enhancements to ensure the continuity of the function of the flexible scraper element, which separates plastic and waste (pollution, foreign matter) from each other, presses on the filtering element to be used in recycling systems for the recovery of plastic materials, to enable the scraper to sharpen itself, to prevent permanent damage on the filtering element due to the melt pressure.

STATE OF THE ART

Plastic is an organic (and synthetic) material with petroleum raw material that can be hardened after being processed and shaped in liquid form. Plastic is formed by polymerizing small molecule polymers by combining them, thus forming large molecule polymers, and adding many additives to these polymers. Plastic that can be processed easily, is more resistant to climatic conditions than metals and can be produced very cheap, is used in many areas. Telephone body and handset, kitchenware, bottles, packaging, furniture and many other materials are made of plastic. Plastics, which are already so easy to process, are very difficult to dissolve in nature. Thus, it must be recycled and used again. Recycling systems are used in the recovery of plastics. In recycling systems, there are filters that separate plastic and waste (impurities, foreign substances) from each other and allow the plastic to be recovered.

Plastic recycling is the process of recycling waste plastics into recyclable raw materials. Plastic recycling begins with sorting waste plastics by type. Plastics are transformed into raw materials by re-melting and granulating using plastic recycling extruders. Here, filters are used to separate dirt, sediment and similar substances in the plastic from the plastic raw material. The present invention subject to the specification is a filter intended for this purpose.

The scraper elements used in the filters of the state of the art are not produced in a flexible structure and are not fixedly configured. In this case, the continuity of the scraper movement cannot be maintained, the scrapers become blunted in a short time and become unusable and replacement is required. In the invention subject to the description, the scraper is designed in a flexible structure and is placed in the filter in a fixed manner, thus the scraper movement is made continuousşy, the scraper is sharpened continuously and the useful life of the scraper is extended.

In the filters of the state of the art, the filtering elements can be permanently damaged due to the melt pressure. No measures have been taken to overcome this, and the filtering elements must be replaced due to lasting damage. In the invention subject to the specification a discharge element forming an opening in high pressure situations is used to solve this problem.

The cleaning performance of the filters used in the state of the art technique is low. Existing filters are insufficient to separate plastic raw material from impurities and foreign substances.

In the filters used in the state of the art technique, as the filter sieves become blocked by impurities and unwanted foreign substances during the filtering process, they are replaced with a new one by the operator. This causes continuous loss of consumable material and losses in the production volume, and since the sieves are manufactured as mesh type, the pores in this mesh sieve expand and reduce the filtering performance due to the pressure of the plastic melt and the pressure of the particles causing pollution. In the invention subject to the specification, while the sieves have the filtering capability that does not decrease with the unchanged filtering gaps, it has a mechanism that allows unwanted foreign substances to be scrapped off the filtering element and discharged, and a design that reduces labor and raw material loss by changing it in a longer time than existing filters. Thus, performance is increased, energy consumption is reduced and an alternative filter structure to the known technique is offered.

In the Chinese patent document No CN210453357 (U) encountered in the literature search, a device for separating fiber and plastic materials in wastes is described. The present device has a filter that provides this condition. However, no mechanism has been found that allows unwanted foreign substances to be scraped off the filtering element and discharged. Therefore, the cleaning performance of the device is very low.

In the Chinese patent document No CN210389794 (U) encountered in the literature search, a device for plastic processing, recycling and reconstruction is described. In the device mentioned here, no study has been found on a mechanism that scraps unwanted foreign substances and filter channels that are not clogged. Therefore, the cleaning performance of the device is very low.

As a result, there is a need for a micro filter to be used in plastic recycling, where the state of the art is exceeded and its disadvantages are eliminated.

SHORT DESCRIPTION OF INVENTION

The present invention is a filter device to be used in plastic recycling, where the known state of the art is exceeded, its disadvantages are eliminated and it has additional features.

The object of the invention is to introduce a new filter device in which the scraper element is placed in a fixed position and designed flexibly, thus ensuring the continuity of the function of the flexible scraper element that presses on the filtering element, and the scraper element is continuously sharpened and its service life is extended.

Another object of the invention is to introduce a new filter device with a discharge element that forms a gap to prevent permanent damage to the filtering elements due to the melt pressure.

Another aim of the invention is to introduce a new filter device that allows the molten plastic to be purified from impurities (Here, the impurities are not only meant by paper, silicon, dust, glass, metal and similar. For example, another plastic that can also be melted but of which melting temperature is higher than our recycled material also causes process pollution. Actually, it is also a raw material. However, the material with a high melting temperature cannot melt inside the material with a low melting temperature, so it is attached to the filter and discharged out.) in it during the recovery of plastics.

Another purpose of the present invention is to introduce a new filter device for filtering all molten or fluid materials, especially plastics.

Another purpose of the invention is to provide a filter device with high performance and low energy consumption in order to separate plastics from dirt, residue and unwanted substances.

Another object of the invention is to introduce a filter device, which is an alternative device for separating plastic and dirt from each other, for use in plastic recycling systems and facilities.

The present invention is a filter device in order to realize all the purposes mentioned above and that will emerge from the detailed description below, whereby with enhancements to ensure the continuity of the function of the flexible scraper element, which separates plastic and waste (pollution, foreign matter) from each other, presses on the filtering element to be used in recycling systems for the recovery of plastic materials, to enable the scraper to sharpen itself, to prevent permanent damage on the filtering element due to the melt pressure, and characterized in that the filtering device main body consists of a scraper element with a flexible structure that is fixedly placed on the main body of the filter device or on the scraper element carrier body, to create continuous pressure, to tolerate the defects on the surface and to sharpen the scraper element surfaces that constantly rub against the filter element while the filtering element is moving and comprised of a pressure discharge element that can be opened and closed, which can create a gap to eliminate damages caused by reverse pressure on the device, especially the filtering element.

DESCRIPTION OF THE FIGURES

The present invention will be described with reference to the accompanying figures, so that the features of the invention will be more clearly understood. However, it is not intended to limit the invention to these particular embodiments. On the contrary, it is intended to cover all alternatives, modifications and equivalents that may be included within the scope of the invention as defined by the appended claims. It should be understood that the details shown are illustrated solely for the purpose of illustrating preferred embodiments of the present invention, and are presented to provide the most useful and easy to understand description of both the embodiment of the methods and the rules and conceptual features of the invention. In these drawings:

FIG. 11 is an alternative view showing a cross-sectional view of the filtering element carrier body.

FIG. 12 is the view of detail D.

FIG. 13 is an alternative view showing a cross-sectional view of the filtering element carrier body.

FIG. 14 is the view of detail E.

Figures that will help to understand this invention are numbered as indicated in the attached picture and are given below with their names.

DESCRIPTION OF THE REFERENCES

1. Inlet connection body
2. Connection body gap
3. Main body fluid transmission duct inlet
4. Filtering device main body
5. Main body fluid transmission duct
6. Main body fluid routing duct
7. Main body fluid routing geometry
8. Filtering element carrier body
9. Filtering element
10. Filtering element duct
11. Carrier body duct
12. Carrier body gap
13. Pressure discharge element
14. Discharge element fluid routing geometry
15. Rotary shaft
16. Rotary shaft fluid transmission ducts
17. Rotary shaft bearing body
18. Bearing body transmission duct
19. Cleaned fluid outlet body
20. body transmission duct
21. Pressure sensor
22. Rotation motion drive device
23. Scraper element
24. Scraper element carrier body
25. element carrier body gap
26. Dirt and sediment removal element
27. Discharge duct
28. Fan
29. Air routing duct
30. ducts
31. Cooling zone
32. Motion and force generator
33. Vertical motion and force transmission element
34. Rotation motion and force transmission element
35. Rotation motion supply element
36. Scraper element connection gap
37. Plastic inlet direction
38. Plastic outlet direction
39. Discharge element drive tool
40. element fixing element
A, B, C, D, E. Detail views in the figures.

DESCRIPTION OF THE INVENTION

In this detailed description, the filter device subject to the invention is explained only for a better understanding of the subject, with examples that do not create any limitation. The specification describes a filter device with enhancements to ensure the continuity of the function of the flexible scraper element (23), which separates plastic and waste (pollution, foreign matter) from each other, presses on the filtering element to be used in recycling systems for the recovery of plastic materials, to enable the scraper to sharpen itself, to prevent permanent damage on the filtering element (9) due to the melt pressure.

Figure 1:
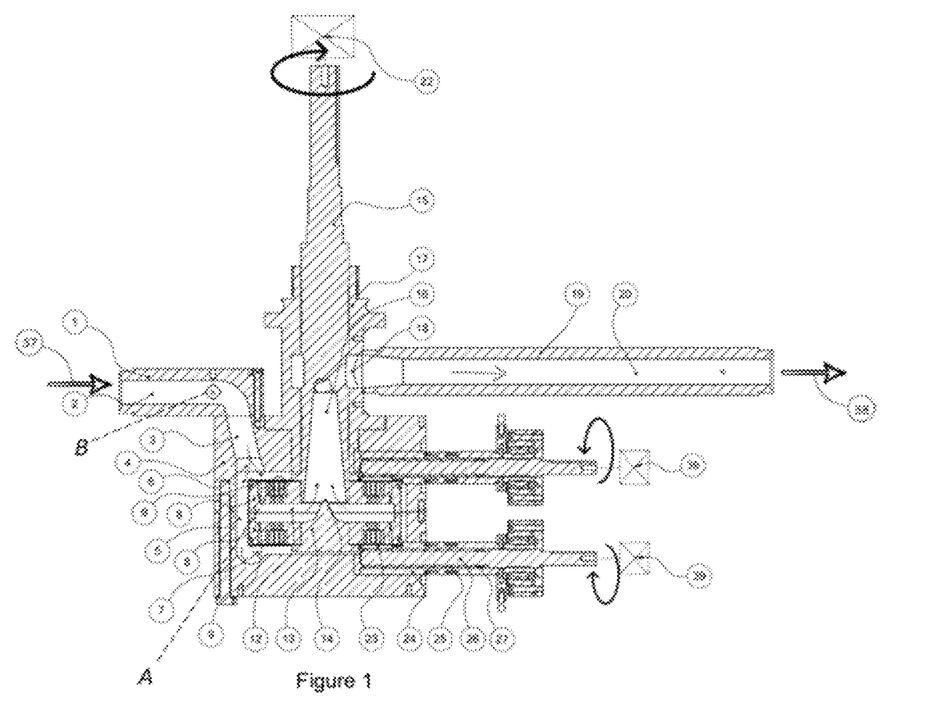
FIG. 1 is the cross-sectional view of the filter device subject to the invention.
Figure 2:
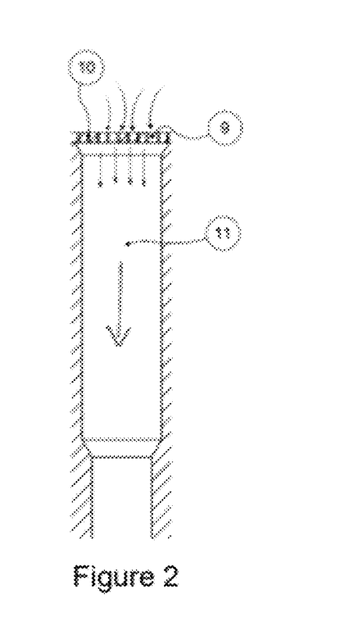
FIG. 2 is the view of detail A.

In FIG. 1, the cross-section view of the filter device according to the invention, which provides the purification of the plastic melted for recovery from dirt and residues is given. Plastic melt enters through the connection body gap (2) located in the inlet connection body (1) and is directed from the main body fluid transmission channel duct (3) towards the main body fluid transmission duct (5) located inside the filtering device main body (4). From the fluid transmission duct (5), the plastic melt is directed to the filtering element (9) by means of the main body fluid rotating duct (6) and the main body fluid rotating geometry (7). Meanwhile, the pressure of the plastic melt filling the inside of the connection body gap (2) continues to increase and the plastic melt, of which pressure has increased, is transmitted to the carrier body ducts (11) located on the filtering element carrier body (8) through the filtering element ducts (10) and from there, it is directed to the carrier body gap (12). (FIG. 2, (View of detail A in FIG. 1)) The plastic melt filling the bearing body gap (12) moves along the rotating shaft fluid transmission duct (16) with the help of the discharge element fluid routing geometry (14) located on the pressure discharge element (13) and is located on the rotating shaft bearing body (17) and the bearing body directs from the transmission duct (18) and the cleaned fluid is transmitted to the outlet body transmission duct (20) located inside the outlet body (19). Meanwhile, the pressure sensor (21) continuously monitors the pressure of the plastic melt flowing from the connection body gap (2).

Figure 3:
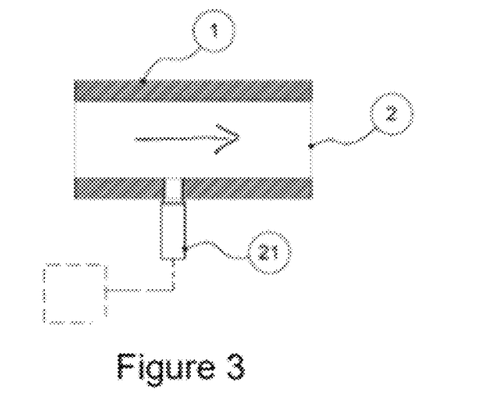
FIG. 3 is the view of detail B.

(FIG. 3, (view of detail B in FIG. 1)) As long as the filtering element (9) is filtering, impurities begin to accumulate on its surface and it becomes unable to perform its filtering task efficiently. In the meantime, the pressure of the plastic in the inlet area (1) begins to increase. When this pressure reaches the high pressure set value set on the control panel, the rotating shaft (15) starts to rotate, the rotation movement being driven in some way (can be driven in another way) from the drive tool (22).

During this rotation, the scraper element (23) is in pressure on the filtering element (9) perpendicular to the rotational direction and starts to scratch/scrap off the dirt and residue accumulated on the filter element (9) with the start of the rotational movement. This scratched/scraped dirt and debris is directed to the scraper element carrier body gap (25) with the help of the scraper element (23) and the scraper element carrier body (24). The dirt and sediment discharge element (26), which is located in the scraper element carrier body gap (25) and gets its movement somehow from the discharge element driving tool (39), directs this dirt and debris towards the discharge duct (27). The filtering element (9), of which the impurities are cleaned by a scraper, starts to filter again and this cycle continues in this way lastingly.

Figure 4:
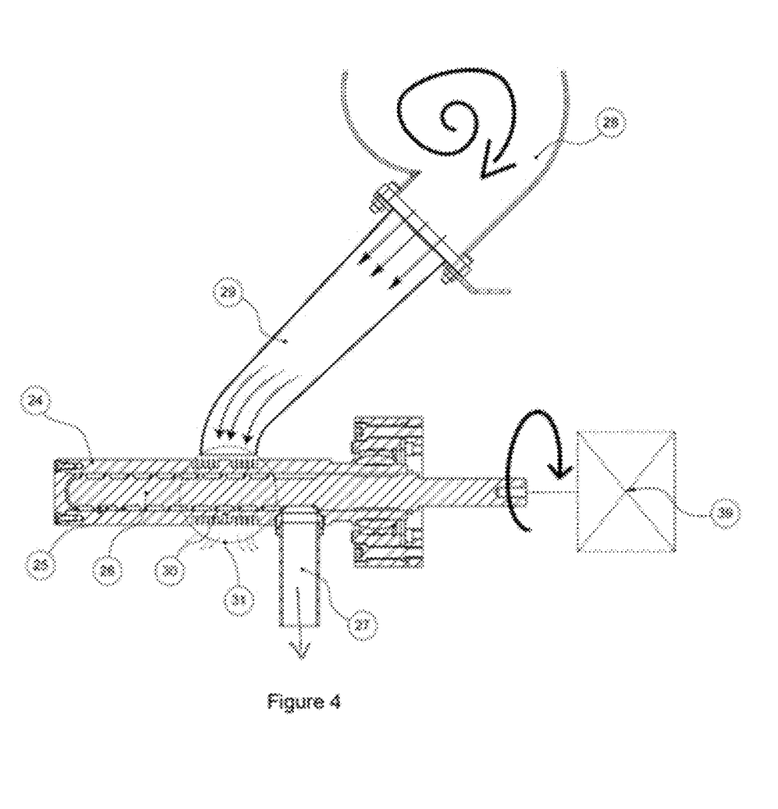
FIG. 4 is the view showing the fan and discharge section used in the filter subject to the invention.

During this cycle, the plastic melt in the filtering device is fluid and tends to flow continuously into gaps/environments where pressure is low. This is a danger to the filter device and should be prevented. FIG. 4 shows the view showing how this can be prevented. The fan (28) shown in the figure transmits the air to the cooling ducts (30) located on the scraper carrier body (24) via the air routing duct (29). Cooling ducts (30) reduce the temperature of the plastic in the scraper element carrier body gap (25). The fluidity of the plastic of which temperature decreases begins to decrease and a thermal blockage zone is formed by ensuring that the plastic is sufficiently cooled in a cooling zone (31) where the cooling ducts (30) are located. The cooled plastic becomes unable to move itself in this area. Thus, the plastic melt inside the filtering element (9) is prevented from escaping to the outside environment with lower pressure. Cooler ducts (30 located on the cooling zone (31) can also be cooled with the help of water or other fluids.

Figure 5:
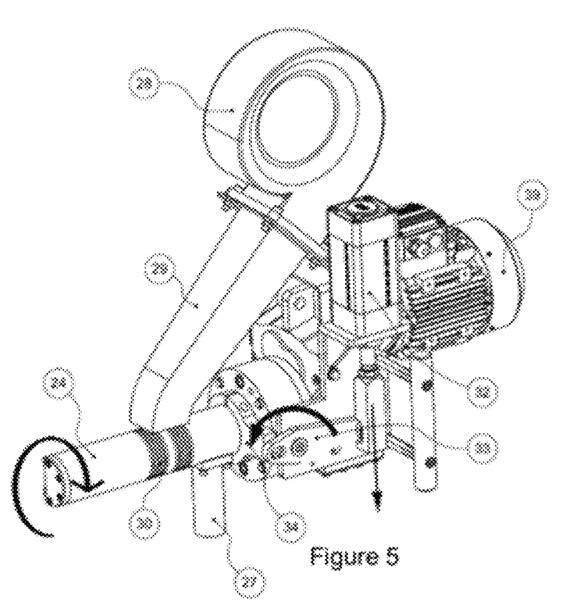
FIG. 5 is the view showing the scraper element carrier body, the air blower and the scraper element.

In FIG. 5, the view showing the scraper element carrier body (24) of the filter device, the fan (28) and the scraper element (23) is given. The figure shows how it provides the pressure movement and force to the scraper element (23) that presses the filter element (9) during filtering. The motion and force generator (32) shown in the figure transmits these dimensions to the vertical motion and force transmission element (33). The vertical force and motion transmission element (33) also transfers these dimensions to the rotational force and motion transmission element (34) fixed on the carrier body No (24). The rotational movement and the force transmitted from the rotation force and motion transmission element (33) to the scraper element (23) ensure that the dirt and residue on the filtering element (9) are cleaned and pressed and the scraper performs its function. This motion and force can be transmitted directly, as well as produced and transmitted by means of hydraulic, pneumatic, electrical or mechanical generators.

Figure 6:
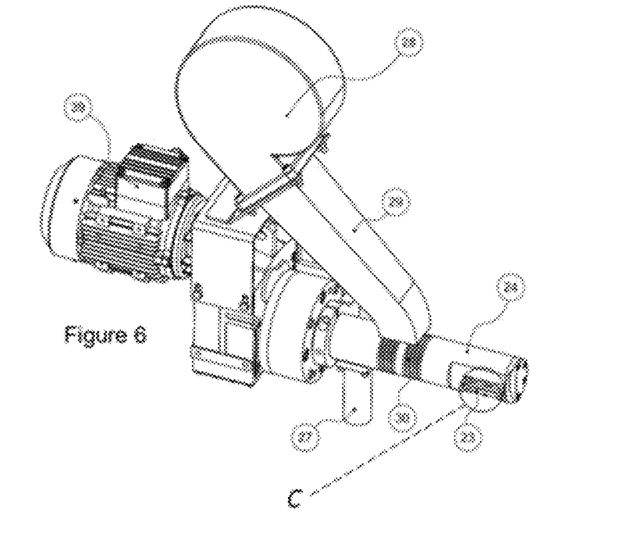
FIG. 6 is the opposite angle view showing the scraper element carrier body, the air blower and the scraper element.
Figure 7:
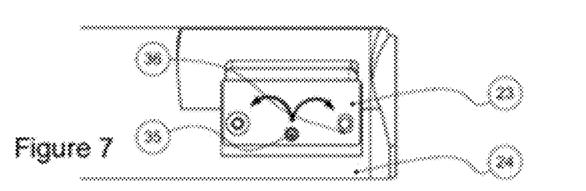
FIG. 7 is the view of detail C.

The scraper element carrier body (24) and the scraper element (23) shown in FIG. 6 and FIG. 7 (the view of detail C in FIG. 6) show the details of how they are fixed. The scraper element (23) is fixed to the scraper element carrier body (24) in a mobile or stationary manner. An advantage of its mobile fixation is to ensure that the scraper element (23), which presses on the filtering element (9), performs a continuous and smooth scraper operation by compensating the surface deformations that may occur on the surface of this filter element (9) by swinging during the filtering process. This movement is provided by a rotation movement element (35) located on the scraper element carrier body (24) and the scraper element connection gap (36) located on the scraper element (23). The inlet direction (37) of the plastic containing impurities and the outlet direction (38) of the clean plastic are shown on FIG. 1.

In FIG. 11 and FIG. 12 (view of detail D in FIG. 11) an alternative fixing way of the scraper element (23) is shown. Unlike FIG. 7, in this case, the scraper element (23) is fixed on the main body of the filtering device (4) or on the scraper carrier body (24) in a way that it is stationary. In the invention, a scraper fixing element (40) is preferably used to fix the scraper element. In this case, a scraper element (23) with a flexible structure contacts the filtering element (9) and stretches backwards and exerts a pressure on the filtering element (9) thanks to its spring feature. (FIG. 12) By virtue of this flexible structure of the scraper element (23), the defects on the surface can be tolerated and the scratching/scraping process is carried out continuously by providing continuous contact with the filtering element (9). Another advantage of fixing the scraper element (23) in this way is that the filtering element (9) will somewhat grind itself by abrading the scraper element (23) with which it is in constant contact, and the continuously sharpening scraper element (23) will be able to perform the scratching/scraping function for a longer time.

Figure 8:
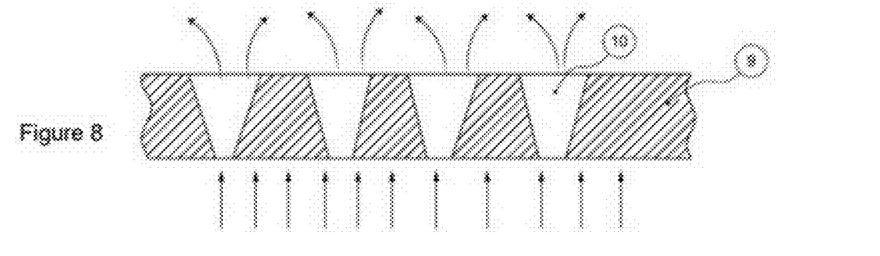
FIG. 8 is an alternative view showing a cross-sectional view of the filtering element.
Figure 9:
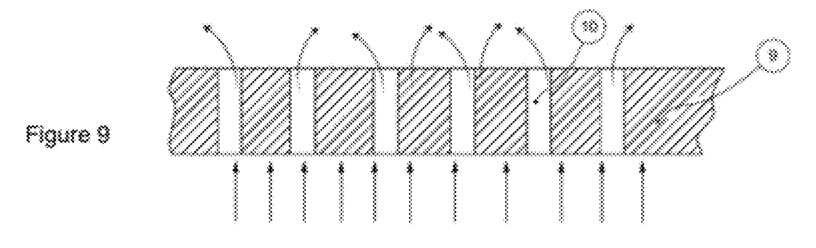
FIG. 9 is another alternative view showing the sectional picture of the filtering element.
Figure 10:
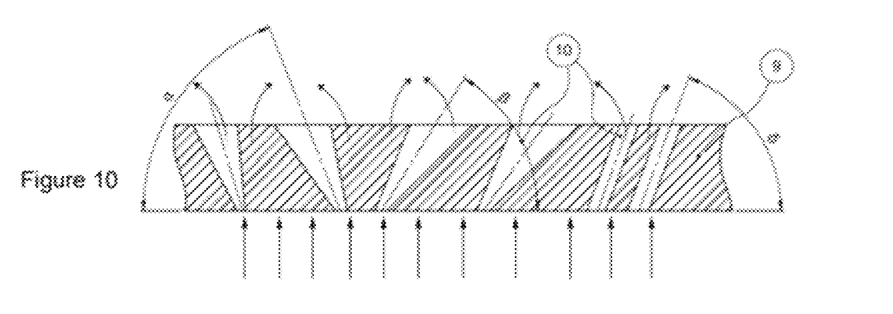
FIG. 10 is another alternative view showing the sectional picture of the filtering element.

In FIGS. 8, 9 and 10, there is a view showing alternative forms of the filter element ducts (10) located on the filtering element (9). The filter element ducts (10) shown in the figure may have a straight cylinder, angled cylinder or conical form. The axis of this cylinder and cone can be perpendicular to the surface of the filtering element (9) or at different angles as shown in the figures. Except for those shown in the figures, the filter element ducts (10) can have an irregular shape with or without an angle resembling a cylindrical or conical shape.

In FIG. 13 and FIG. 14 (view of detail E in FIG. 13), it is shown how the damage to the system caused by the reverse pressure on the filtering element (9) is eliminated when the main body of the filtering device (4) is separated from each other. As soon as the main body of the filtering device (4) is separated from each other, the high-pressure melt carrier body duct (11) applies reverse pressure on the filtering element (9), and depending on this pressure intensity, the filtering element (9) may be permanently damaged. This high reverse pressure created inside allows the pressure discharge element (13) fixed on the filtering element carrier body (8) to form a gap between the filtering element carrier body (8) and the pressure discharge element (13) by moving the pressure discharge element (13) and the high pressure melt moves towards this opening and protects all components on the filtering device, especially the filtering element (9), against deformations that may occur under reverse pressure.

The invention claimed is:

1. A filter device which separates plastic and waste (pollution, foreign matter) from each other, presses on the filtering element to be used in recycling systems for the recovery of plastic materials, to enable the scraper to sharpen itself, to prevent permanent damage on the filtering element (9) due to the melt pressure, and characterized in that;
   comprised of a scraper element (23) that is fixedly placed on the main body of the filter device (4) or on the scraper carrier body (24) and has a flexible structure in order to create continuous pressure, to tolerate surface defects and to sharpen the scraper surfaces of the filter element (9) while rotating,
   comprised of a pressure discharge element (13) configured in a collapsible manner that can form an opening to eliminate damages caused by reverse pressure, especially the filtering element (9) in case the main body of the filtering device (4) is opened.

2. A filter device according to claim 1, and characterized in that; it comprises a scraper element fixing element (40) which enables the scraper element (23) to be fixedly placed on the filter device main body (4) or on the scraper element carrier body (24).

3. A filter device according to claim 1, and characterized in that; it comprises a filtering element (9) on the filter element carrier body (8) that separates the dirt and residue in the molten plastic entering from the connection body gap (2).

4. A filter device according to claim 1, and characterized in that; it comprises the scraper element (23) located on the scraper carrier body (24), which scratches/scrapes the dirt and debris accumulated on the surface of the filtering element (9).

5. A filter device according to claim 1, and characterized in that; it comprises the scraper carrier body gap (25) where this dirt and debris scratched/scraped from the filter element (9) is directed by means of the scraper element (23).

6. A filter device according to claim 1, and characterized in that; the dirt and sediment discharge element (26), which is located in the scraper element carrier body gap (25) and gets its movement somehow from the discharge element driving tool (39), directs this dirt and debris towards the discharge duct (27).

7. A filter device according to any claim 1, and characterized in that; it comprises a motion and force generator (32) that provides the necessary power supply far the rotation of the scraper element (23).

8. A filter device according to claim 1, and characterized in that; it comprises a vertical movement and force transmission element (33) that transmits the vertical force coming from the motion and force generator (32) to the rotation motion and force transmission element (34).

9. A filter device according to claim 1, and characterized in that; it comprises a rotation motion and force transmission element (34) that transfers the force and motion coming from the vertical movement and force transmission element (33) to the rotation movement supply element (35).

10. A filter device according to claim 1, and characterized in that; it comprises the rotation movement supply element (35) located on the scraper element connection gap (36), which transfers the force from the transferring rotation movement and force transmission element (34) to the scraper element (23).

11. A filter device according to claim 1, and characterized in that; it has a plurality of filtering element ducts (10) on the filtering element (9), which have a flat cylinder, angled cylinder or conical form.

12. A filter device according to claim 1, and characterized in that; the axis of the cylinder and cone of the filtering element ducts (10) is perpendicular to the surface of the filtering element (9).

13. A filter device according to claim 1, and characterized in that; the filtering element ducts (10) are configured such that the axis of the cylinder and the cone form different angles with the surface of the filtering element (9).

14. A filter device according to claim 1, and characterized in that; the filtering element ducts (10) are structured like a cylinder and/or cone but in irregular form.

15. A filter device according to claim 1, and characterized in that; the filtering element ducts (10) are configured in an irregular shape that does not resemble any shape.

16. A filter device according to claim 1, and characterized in that; the filtering element ducts (10), which are structured in an irregular form, are positioned at different angles.

* * * * *